Figure 1:
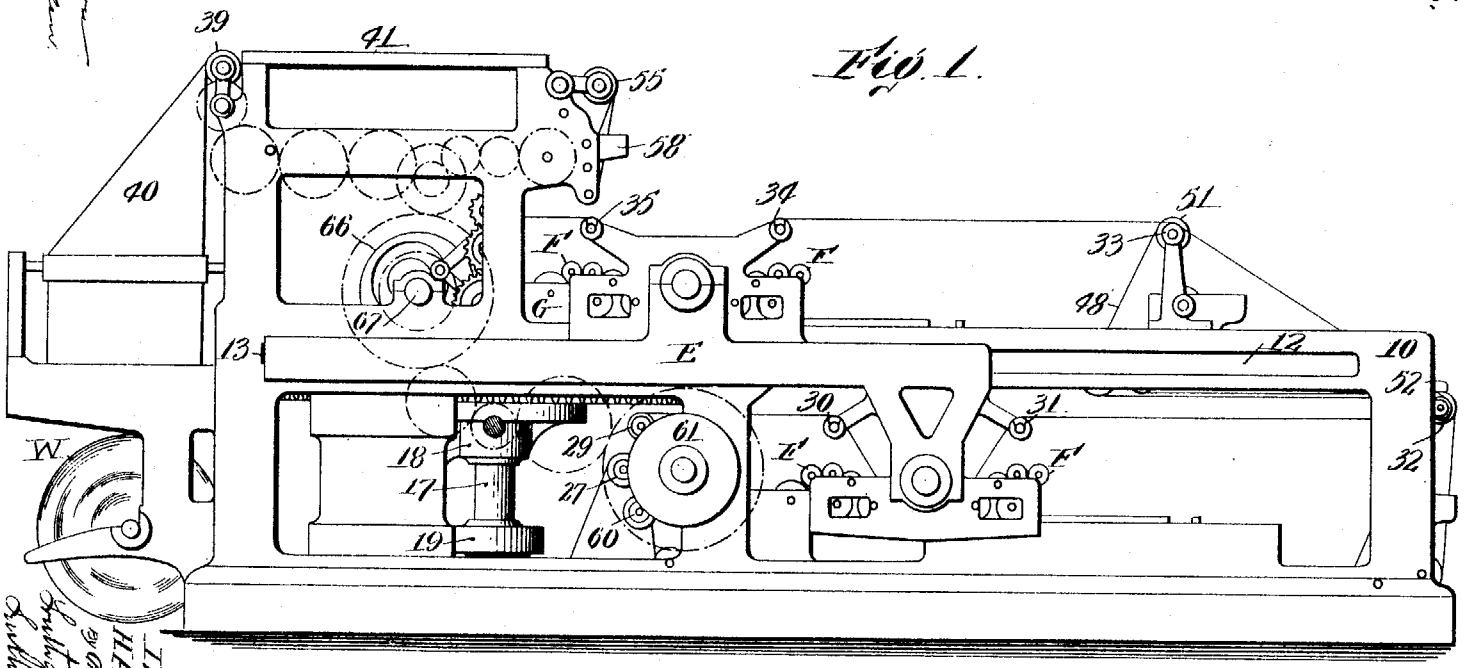

256

Examiner

H. A. W. WOOD.

PRINTING MACHINE.

APPLICATION FILED OCT. 14, 1907.

12,899.

Reissued Dec. 15, 1908.

3 SHEETS—SHEET 1.

Orig. No. 861,416.

37747

Witnesses:
C. F. Mason
E. M. Allen

Inventor:
H. A. W. Wood
by Attorneys
Lutkgate & Lutkgate

THE NORRIS PETERS CO., WASHINGTON, D. C.

101 PRINTING.

256

H. A. W. WOOD.

PRINTING MACHINE.

APPLICATION FILED OCT. 14, 1907.

12,899.

Reissued Dec. 15, 1908.

3 SHEETS—SHEET 2.

Witnesses:
C. F. Mason
E. M. Allen.

Inventor:
H. A. W. Wood
by Attorneys
Rutlidge & Lothgate

THE NORRIS PETERS CO., WASHINGTON, D. C.

256

H. A. W. WOOD.

PRINTING MACHINE.

APPLICATION FILED OCT. 14, 1907.

12,899.

Reissued Dec. 15, 1908.

3 SHEETS—SHEET 3.

Witnesses:
C. F. Wesson
E. M. Allen.

Inventor:
H. A. W. Wood.
By Attorneys
Lutkgate & Lutkgate

THE NORRIS PETERS CO., WASHINGTON, D. C.

Examiner

257

UNITED STATES PATENT OFFICE.

HENRY A. WISE WOOD, OF NEW YORK, N. Y., ASSIGNOR, BY MESNE ASSIGNMENTS, TO DETROIT TRUST CO., TRUSTEE, OF DETROIT, MICHIGAN, A CORPORATION OF MICHIGAN.

PRINTING-MACHINE.

No. 12,899. Specification of Reissued Letters Patent. Reissued Dec. 15, 1908.

Original No. 861,416, dated July 30, 1907, Serial No. 350,566. Application for reissue filed October 14, 1907. Serial No. 397,464.

*To all whom it may concern:*

Be it known that I, HENRY A. WISE WOOD, a citizen of the United States, residing at New York, in the county of New York and State of New York, have invented a new and useful Improvement in Printing-Machines, of which the following is a specification.

The aim of this invention is to improve the construction of traveling cylinder web printing machines, and the improvements are especially applicable to the form of this machine in which the web is perfected or printed on both sides.

The improvements may be summed under four heads. The first improvement consists in including the driving mechanism for reciprocating the cylinders between the side-frames of the machine so that the same is out of the way, whereby the machine is rendered much safer and more efficient in operation. The second improvement consists in arranging the loopers that shift the web through the printing mechanism in position to move substantially parallel to the movement of the carriers so that the web will pass directly from the feeding-in looper to a guide moving at one side of the first impression cylinder, and directly from the guide moving at one side of the second impression cylinder to the feeding-out looper, this arrangement saving a number of bends in the web, and rendering the feeding action very easy and direct. The third improvement consists in providing gearing for positively turning the feeding-out looper so that the web will be coaxed or combed around the same. The fourth improvement consists in the special arrangement of the beds, whereby they are arranged horizontally in different planes, and one in advance of the other. A traveling-cylinder, web-perfecting printing machine having these improvements is illustrated in the accompanying three sheets of drawings.

Figure 2:
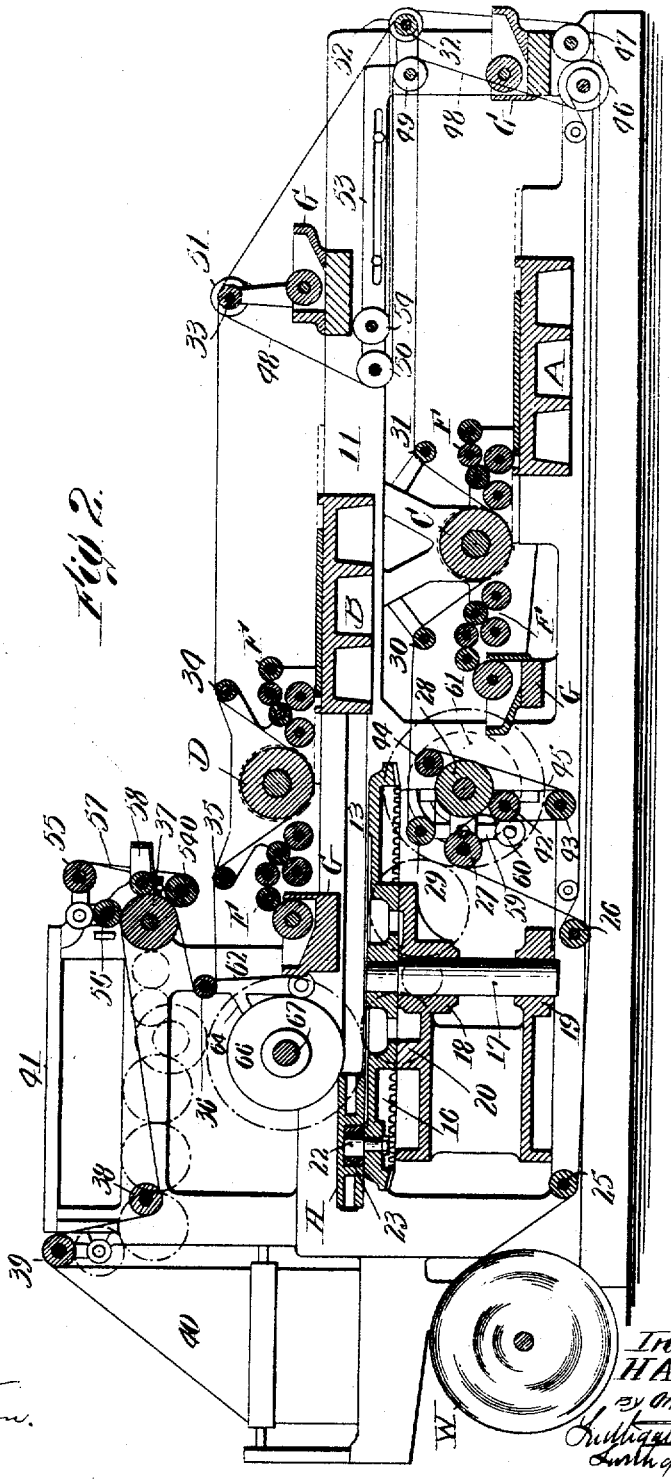
Figure 3:
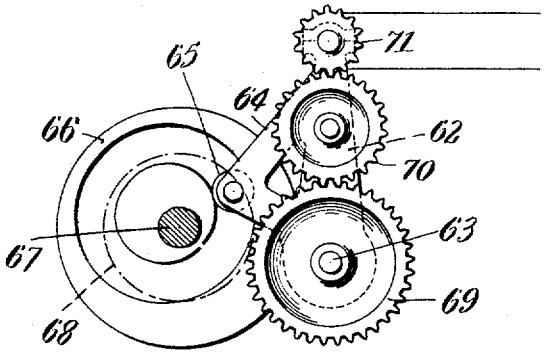
Figure 4:
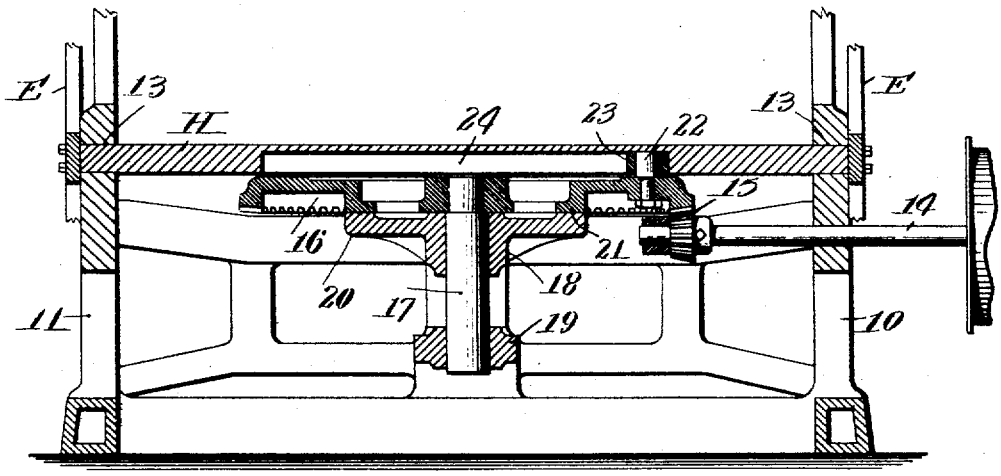

Referring to the drawings and in detail, Figure 1 is a side elevation of the machine, Fig. 2 is a sectional elevation thereof, Fig. 3 is a detail view upon an enlarged scale of the gearing used to turn the feeding-out looper, and Fig. 4 is a cross-sectional view of the driving mechanism.

The specific improvements before referred to can best be understood by a detailed description of the entire machine.

Referring to the drawings and in detail 10 and 11 designate the side frames of the machine, between which are secured the form-beds A and B. The form-beds A and B are horizontally arranged, and the form-bed A is arranged in advance of the bed B, so that the beds are rendered very accessible for the purpose of placing the forms thereon.

C designates the first impression cylinder, and D the second impression cylinder. These impression cylinders are journaled in the movable carriers E E, and have the usual gears arranged at the ends thereof to mesh with racks secured at the sides of the beds, as indicated in dotted lines in Fig. 2, so that, as the cylinders are moved forwards and backwards over the beds, the same will be positively turned to roll thereover.

Mounted in the movable carriers E E at each side of each impression cylinder are a number of form inking rollers F F F F, which are arranged to take ink from the fountains G G G G, which are arranged at each end of each bed, and apply the same to the forms. The movable carriers E E are connected together at their rear ends by means of a tie or brace H. The movable carriers E E are fitted to slide in ways 12—12 cut or planed into the side-frames 10 and 11, and the tie or cross-brace H is arranged to work in slots 13—13 cut in the side-frames 10 and 11.

14 designates the driving shaft, to which power can be applied in any of the ordinary manners. On the end of this shaft 14 is arranged a bevel-pinion 15, which meshes with a large, horizontally-arranged bevel-gear 16, which is mounted on the end of a shaft 17 journaled in suitable bearings 18 and 19. The upper bearing 18 has a suitable extending supporting flange 20, which engages a flange 21 on the bevel-gear 16, so that the bevel-gear 16 is rigidly journaled and supported. A wrist-pin 22 is secured in the bevel-gear, and fitting on the same is a square block 23, which engages a slot or groove 24 formed or planed in the under side of the brace or tie H. By this construction, as the bevel-gear 16 is rotated, the movable carriers E E and the parts mounted therein will be moved forwards and backwards. This forms a very strong, simple and direct driving mechanism, which is especially advantageous for use in machines of this character, as being included entirely between the side-frames, the operators cannot be hurt thereby, and it is further an advantageous construction in that no pitmen are used, whereby the reversal in either direction takes place at the same speed and in the same time, so that the shift of the web in the machine takes place under the same conditions, when the impression cylinders reverse off the forms in either direction.

The web to be printed is drawn from a web-roll W, which may be arranged in suitable bearings or brackets extending from the side-frames in the usual manner. The web is led first around rollers 25 and 26 journaled in the side-frames, then around a roller 27, then around a drum 28, which is termed the feeding-in drum, then around the feeding-in looper 29, then to a guide or roller 30 journaled in the carriers E E, then under the impression cylinder C, then over a guide or roller 31 journaled in the carriers E E, then around the rollers 32 and 33, then around a roller or guide 34 journaled in the carriers E E under the impression cylinder D, then around a guide or roller 35 journaled in the carriers E E, around the feeding-out looper 36, then around a drum 37, which is termed the feeding-out drum. At this point the web may be severed into sections in the ordinary manner, and one section of the web led around rollers 38 and 39, and the other section around suitable turner-bars 41 in the ordinary manner, so that the plicated sections can be passed over a longitudinal former or folder 40, and the sheets cut therefrom and delivered and folded in any of the ordinary ways, as desired.

It will be seen that by this passage through the machine, the web will be printed on opposite sides or perfected.

42, 43 and 44 designate a series of tape-pulleys or rollers, around which run a set of tapes 45, which co-act with the feeding-in drum 28, so that the web will be positively and evenly pulled from the web-roll W.

46 and 47 designate two pulleys. One of these pulleys, as 46, may be driven by any suitable gearing, as by a belt from the roller 26.

53 designates adjustable frames, in which frames the roller 32, before referred to, is journaled. Also arranged in one of these frames are pulleys 49, 54 and 50, and a pulley 52 is arranged on the same shaft as the roller 32. A pulley 51 is also arranged on the same shaft as the roller 33. A belt 48 is passed around the pulleys 46, 47, 52, 54, 51, 50 and 49, so that the rollers 32 and 33 will be positively turned in a direction to tend to coax or comb the web through the machine. By this arrangement, it will also be seen that the roller 32 can be adjusted without disturbing the tension of the belt 48, this adjustment of the roll 32 being used to obtain register, that is, to so adjust the length of the web between the two impression cylinders, that the impressions printed upon opposite sides will properly lie back to back. This adjustment does not effect the tension of the belt 48, for if the frames 53 are moved to the left, the loop in the belt from pulley 54 around pulley 51 to pulley 50 will be engaged, while the loop in the belt from pulley 49 around pulleys 46 and 47 up to pulley 52 will be correspondingly shortened and vice versa.

540, 55 and 56 designate suitable tape-pulleys or rollers, which are mounted in the frame, and which carry suitable tapes 57 co-acting with the periphery of the feeding-out drum 37, so that the web will be positively coaxed or combed around the feeding-out drum. A pasting device 58 consisting of the usual receptacle and roll is arranged in position so that a line of paste may be deposited upon the web in such position that when the same is cut into sections and associated together the sections will be pasted together. The feeding-in looper 29 is journaled in suitable arms 59, mounted on a shaft 60, and these arms have suitable rollers which engage slots cut in cams 61 arranged on the same shaft as the feeding-in drum 28, so that the feeding-in looper 29 will be vibrated backwards and forwards. The feeding-out looper 36 is journaled in suitable arms 62 mounted on a shaft 63, and the arms 62 have rearward extensions 64 in which are journaled rollers 65, which fit in slots cut in cams 68 arranged upon a shaft 67. It will be seen that the web passes directly from the feeding-in looper 29 to the guide-roller 30 mounted in the movable carriers E, and directly from the guide-roller 35 mounted in the carriers E E to the feeding-out looper 36. By this arrangement, the pull on the web when the same is shifted is transmitted very directly to the points of resistance, that is, to the periphery of the impression cylinders, and a number of bends in the web which are necessarily used in the previously designed presses of this character are done away with, and, by this arrangement, the web can be much easier drawn through the machine.

A gear 68 is arranged on the shaft 67, as indicated in dotted lines in Fig. 3, and this gear meshes with a gear 69 loosely journaled on the shaft 63. An intermediate gear 70 is mounted upon a suitable stud secured to one of the looper arms 62, and this intermediate meshes with and turns a pinion 71 mounted on the shaft of the looper 36. By this arrangement, the looper 36 will be positively turned to coax or draw the web forward around the same.

The oscillation of the arms 62 about the shaft 63 as a center, by means of the gearing referred to, will cause the pinion 71 to turn in such direction and at such speed that the web will not slip on the looper 36, as the looper 36 will unroll or roll up, as it were, in the loop of web around the same, and the gearing before referred to, besides causing

256 the looper to have this rolling and unrolling motion, still turns the same continuously so that the web is drawn around the looper without slip or friction. In designing this gearing it has been found that the best arrangement is to proportion the same so that the looper 36 will turn slightly faster than the continuous movement of the web upon the feeding-in and feeding-out drums, whereby the looper will have a slight pulling or coaxing action on the web at all times. This action tends to greatly help the web through the machine, because it is at this point that most of the strain of feed comes on the web.

Any suitable gearing may be arranged to drive the various parts of the machine, one desirable form of spur gearing being indicated in dotted lines in Fig. 1.

The operation of the parts before referred to is as follows: As the machine is operated, the carriers E E are moved forwards and backwards, and the impression cylinders C and D are thus caused to pass over the forms placed on the stationary beds A and B. When the cylinders C and D are pressing the web on to the forms, the looping roller 29 is caused to move to the left by its cams to take up all the incoming web paid around the feeding-in drum 28, and the feeding-out looper 36 is caused to move to the right to supply the necessary web to the feeding-out drum 37, so that the web can be continuously paid out from the printing mechanism. This opposite movement of the feeding-in and feeding-out loopers takes place at such speed that the web between the loopers will remain stationary during the said printing operation, so that the cylinders will move through moving folds of stationarily held web to effect the printing. As soon as the cylinders pass out of printing contact with the forms, the looper 29 is caused to move to the right, and the looper 36 to the left. The movement of the looper 36 to the left, combined with the action of the feeding-out drum 37, will draw or pull the web that is paid out by the looper 29 and the feeding-in drum 28 forward around the impression cylinders during the period while the impression cylinders are reversing their direction of travel off of the forms, so that when the impression cylinders again come into printing contact with the forms on the return stroke, a fresh portion of web can be presented and printed by each impression cylinder. This feeding or shifting action of course takes place as the cylinders reverse off the forms in either direction, so that the impression cylinders will print on both their forward and backward strokes.

The improvements herein described are applicable to a traveling cylinder web press which prints upon but one side of the web, as for example, the bed B and cylinder D could be considered as omitted, and the web led directly from the roller 33 to the feeding-out looper 36.

By the arrangements herein described and shown, a machine of this character is provided which is very rapid and efficient in operation.

The details herein shown and described may be varied by a skilled mechanic without departing from the scope of the invention as expressed in the claims.

What is claimed is:—

1. The combination in a traveling cylinder web-printing machine of the side frames, two type beds arranged between said side frames, reciprocating carriers fitted on said side frames, an impression cylinder carried by said carriers for each of said type beds, suitable web guides and web manipulating mechanism, and a crank actuated driving mechanism for said carriers included between the side frames.

2. The combination in a web manipulating mechanism for drawing the web through a traveling cylinder web printing machine, of a looper arranged in pivoted arms, a continuously running feeding-out device to which the web passes from the looper, and gearing for rotating the looper, comprising a gear arranged on the pivot of the arms, an intermediate gear journaled on one of the arms, and a pinion arranged on the looper.

3. The combination in a web manipulating mechanism for drawing the web through a traveling cylinder web printing machine, of a looper mounted in arms arranged on a shaft, the looper arms carrying rollers, cams engaging said rollers and actuating the looper, a gear mounted on the shaft, an intermediate gear mounted on one of the looper arms, and a pinion mounted on the looper.

4. The combination in a traveling cylinder web printing machine of the side frames, two type beds arranged between said side frames in different horizontal planes, and one in advance of the other, reciprocating carriers fitted on said side frames, and an impression cylinder for each of said type beds journaled in said carriers.

5. The combination in a traveling cylinder web printing machine of the side frames, two type beds arranged between said side frames in different horizontal planes, and one in advance of the other, carriers fitted on said side frames, an impression cylinder for each of said type-beds journaled in said carriers, and a driving mechanism for said carriers included between the side frames.

In testimony whereof I have hereunto set my hand, in the presence of two subscribing witnesses.

H. A. WISE WOOD.

Witnesses:
MARY E. MCCADDEN,
ANNIE B. WALTERS.